United States Patent

[11] 3,582,919

[72] Inventor Joichiro Ezaki
Funabashi-shi, Japan
[21] Appl. No. 852,668
[22] Filed Aug. 25, 1969
[45] Patented June 1, 1971
[73] Assignee TDK Electronics Company Ltd.
Tokyo, Japan
[32] Priority Aug. 30, 1968
[33] Japan
[31] 43/62175

[54] MAGNETIC-CORE MEMORY MATRIX THREADING SYSTEM
1 Claim, 3 Drawing Figs.

[52] U.S. Cl. .......... 340/174
[51] Int. Cl. .......... G11c 5/02, G11c 11/06
[50] Field of Search .......... 340/174 M, GP, NCC

[56] References Cited

UNITED STATES PATENTS

| | | | |
|---|---|---|---|
| 3,130,391 | 4/1964 | Merz | 340/174 |
| 3,142,049 | 7/1964 | Crawford | 340/174 |

*Primary Examiner*—James W. Moffitt
*Attorney*—Burgess, Ryan and Hicks

ABSTRACT: A magnetic core memory matrix threading system for preventing noise due to induction or induced voltage. A sense winding is arranged to be in the same plane and in parallel with a drive winding. Another drive winding is provided which is not in the same plane and is not in parallel with the parallel sense and drive windings. The parallel sense and drive windings are located between the other drive winding and the surface of a ground element.

MAGNETIC-CORE MEMORY MATRIX THREADING SYSTEM

BACKGROUND OF THE INVENTION

The present invention relates to a magnetic-core memory matrix for electronic computers and more particularly a multiple-winding type magnetic-core memory matrix threading system.

In a multiple-winding type magnetic-core memory matrix which is used generally as a high-speed random access memory, the noise presents some serious problems. There have been generally used the following two methods for preventing the noise due to the induction or inducing voltage.

FIG. 1 illustrates the first method in which the magnetic cores threaded on the drive windings (Y-drive windings in FIG. 1) extending in parallel with the sense winding are divided into two groups *a* and *b* equal in number (four magnetic cores in FIG. 1) and the sense windings are crossed at the boundary between the groups *a* and *b*. Therefore, the noise may be substantially cancelled since the directions of the currents induced in the sense windings in the groups *a* and *b* are opposite to each other. The second method employs a ground element that is a mat provided with an earth pattern (conductors printed upon an insulating material). As shown in FIG. 2, a ground element E is formed upon an insulating base M and the noise voltage $e_g$ induced in sense winding S is given by the following relation;

$$|e_g| = \left| -M_1 \frac{di_1}{dt} - M_2 \frac{di_{1a}}{dt} \right|$$

where $M_1$ = mutual inductance between the sense winding S AND THE Y-drive winding running in parallel with the sense winding S;

$M_2$ = mutual inductance between the ground E and the sense winding S;

$i_1$ = current passing through the Y-drive winding and $i_{1a}$ = current induced in the earth pattern E by the current $i_1$.

(The calculations for obtaining the relation above is not shown).

When there is not provided the ground element E, the noise voltage $e_0$ is not be given by:

$$|e_0| = \left| -M_1 \frac{di_1}{dt} \right|$$

However, since the direction of the current $i_1$ is opposite to that of the current $i_{1a}$, $|e_g| < |e_0|$ Therefore, it will be readily seen that the noise voltage is reduced when the ground element is provided.

However, the complete elimination of the noise realized. The inventor has made extensive studies upon this problem and found out that the cause is the coexistence of various different magnetic-core threading systems in one plane.

In view of the above, the primary object of the present invention is to provide a magnetic-core memory matrix threading system which can eliminate substantially the noise.

SUMMARY OF THE INVENTION

A magnetic-core memory matrix threading system, according to the present invention, is such that a sense winding and a drive winding, which is parallel with said sense winding, are disposed in one plane between said drive winding, which is not parallel with said sense winding, and the surface of a ground element.

A remarkable feature of the present invention is that the noise can be minimized even when a combination of different patterns for arraying a magnetic-core memory matrix is used in one plane.

The above and other objects, features and advantages of the present invention will become more apparent from the following description of one illustrative embodiment of the present invention with reference to the accompanying drawing.

DESCRIPTION OF THE PREFERRED EMBODIMENT

Figure 1:
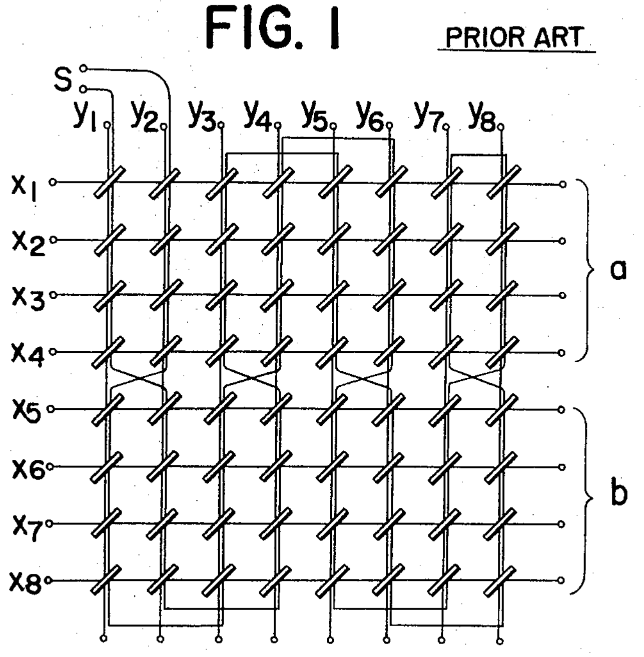
FIG. 1 PRIOR ART
FIG. 1 is a pattern of a three-winding type magnetic-core matrix for electronic computers.
Figure 2:
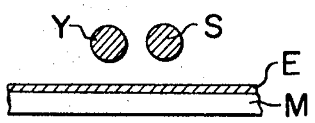
FIG. 2 PRIOR ART
FIG. 2 is a front view of a mat having a ground element.
Figure 3:
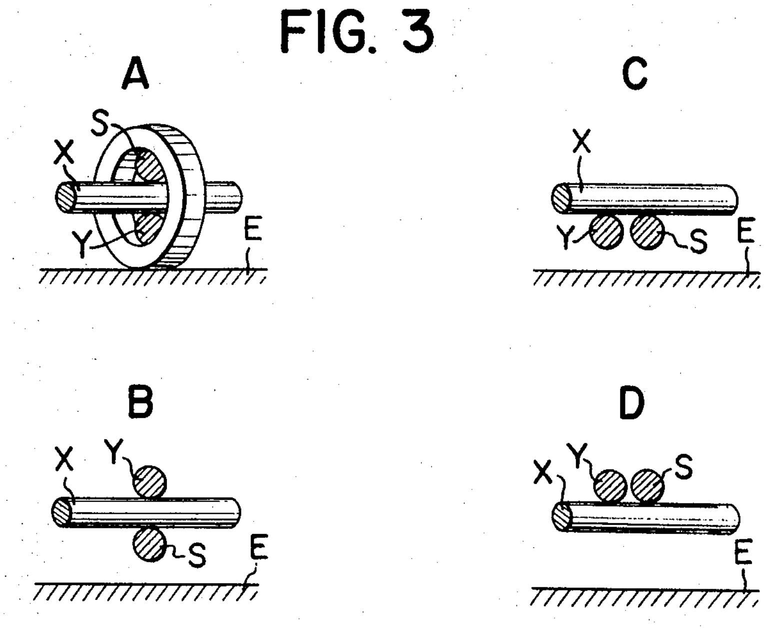
FIG. 3 is for explanation of various threadings of magnetic-core memory matrices.

Now referring to FIG. 3, reference numeral S designates a sense winding; X and Y, drive windings. The four relative positions A, B, C and D of these windings S, X and Y at a core 1 may be considered. (In FIGS. 3B, C and D the core 1 is not shown for simplifying the illustration). Therefore, the noise may be completely eliminated if the cores are arrayed according to only one of the patterns A, B, C and D. In practice, however, it is extremely difficult and almost impossible to array the magnetic cores according to only one pattern so that a different pattern of the order of approximately 3 percent is involved inevitably in one magnetic-core matrix.

The present invention is based upon the results of the studies of the inventor in order to suppress the noise as much as possible by a suitable combination of one selected pattern with a different pattern of magnetic-core matrix. The noise produced by the mixture of a different pattern into a selected pattern of the magnetic-core matrix is dependent upon the maximum difference in noise of the cores. In this case, even when the sizes of the cores vary, the geometrical arrangement of the sense windings and the drive windings may be considered to remain unchanged. The voltages induced in the sense winding for each core whose outer diameter is 0.56 mm. (22 mils) when the current of 320 ma. is passed through the drive winding whose diameter is 0.05 mm. are shown in the following table.

| | A | B | C | D | Maximum noise difference (in mv.) |
|---|---|---|---|---|---|
| Patterns: | | | | | |
| A | 0 | 0.15 | 0.4 | 0.85 | 0.85 |
| B | 0.15 | 0 | 0.55 | 1.0 | 1.0 |
| C | 0.4 | 0.55 | 0 | 0.45 | 0.55 |
| D | 0.85 | 1.0 | 0.45 | 0 | 1.0 |

The patterns A, B, C and D are illustrated in FIG. 3. It is readily seen that the pattern C is best suited in view of the fabrication efficiency and from the Table I. The capacitance noise is of the bilateral type so that it may be completely eliminated by the sense load terminals if there is no delay, thus presenting no problem.

The pattern illustrated in FIG. 3C is used in arraying a three-winding magnetic-core matrix, the noise produced is less even when a different pattern is involved as compared with other patterns. Furthermore, the pattern C much facilitates the fabrication of a magnetic-core memory matrix.

I claim:

1. A magnetic-core memory matrix threading system characterized by mainly employing a pattern in which a sense winding and a drive winding, which is parallel with said sense winding, are disposed in one plane between another drive winding, which is not parallel with said sense winding, and the surface of a ground element.